US010923156B1

(12) United States Patent
Li

(10) Patent No.: US 10,923,156 B1
(45) Date of Patent: Feb. 16, 2021

(54) METHOD AND SYSTEM FOR FACILITATING LOW-COST HIGH-THROUGHPUT STORAGE FOR ACCESSING LARGE-SIZE I/O BLOCKS IN A HARD DISK DRIVE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/795,427

(22) Filed: Feb. 19, 2020

(51) Int. Cl.
*G11B 27/10* (2006.01)
*G11B 20/18* (2006.01)
*G11B 21/00* (2006.01)
*G11B 20/12* (2006.01)
*G11B 5/54* (2006.01)

(52) U.S. Cl.
CPC ........ *G11B 27/102* (2013.01); *G11B 20/1889* (2013.01); *G11B 21/006* (2013.01); *G11B 5/54* (2013.01); *G11B 21/003* (2013.01); *G11B 2020/1238* (2013.01)

(58) Field of Classification Search
None
See application file for complete search history.

(56) References Cited

U.S. PATENT DOCUMENTS 4,562,494 A * 12/1985 Bond ............... G11B 27/36 360/75
4,775,932 A 10/1988 Oxley
4,858,040 A * 8/1989 Hazebrouck ....... G11B 5/5521 360/78.05

(Continued)

FOREIGN PATENT DOCUMENTS

JP   2003022209    1/2003
JP   2011175422    9/2011

(Continued)

OTHER PUBLICATIONS

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

(Continued)

*Primary Examiner* — Tan X Dinh
(74) *Attorney, Agent, or Firm* — Shun Yao; Park, Vaughan, Fleming & Dowler LLP

(57) ABSTRACT

A system is provided to receive a first request to write data to an HDD which comprises a plurality of platters with corresponding heads, wherein a respective platter includes a plurality of tracks. The system aligns the heads at a same first position on a first track of each platter, and distributes the data as a plurality of data sectors to track sectors located at the same first position on the first track of each platter. The system then receives a second request to read the data from the HDD, and aligns the heads at a same random position on (Continued)

the first track of each platter. Subsequently, the system reads, during a single rotation of the platters, all data stored on the first track of each platter, stores the read data in a data buffer, and reshuffles the read data in the data buffer to obtain the requested data.

17 Claims, 10 Drawing Sheets

(56) References Cited

U.S. PATENT DOCUMENTS

| | | | |
|---|---|---|---|
| 5,602,693 A * | 2/1997 | Brunnett | G11B 5/59655 360/77.02 |
| 5,930,167 A | 7/1999 | Lee | |
| 6,148,377 A | 11/2000 | Carter | |
| 6,226,650 B1 | 5/2001 | Mahajan et al. | |
| 6,243,795 B1 | 6/2001 | Yang | |
| 6,795,894 B1 * | 9/2004 | Neufeld | G06F 12/0866 711/113 |
| 7,565,454 B2 | 7/2009 | Zuberi | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,751,763 B1 | 6/2014 | Ramarao | |
| 8,825,937 B2 | 9/2014 | Atkisson | |
| 8,949,208 B1 | 2/2015 | Xu | |
| 9,043,545 B2 | 5/2015 | Kimmel | |
| 9,088,300 B1 | 7/2015 | Chen | |
| 9,092,223 B1 | 7/2015 | Pani | |
| 9,141,176 B1 * | 9/2015 | Chen | G11B 19/06 |
| 9,208,817 B1 * | 12/2015 | Li | G06F 3/0631 |
| 9,280,472 B1 | 3/2016 | Dang | |
| 9,280,487 B2 | 3/2016 | Candelaria | |
| 9,311,939 B1 * | 4/2016 | Malina | G11B 19/042 |
| 9,436,595 B1 | 9/2016 | Benitez | |
| 9,529,601 B1 | 12/2016 | Dharmadhikari | |
| 9,588,698 B1 | 3/2017 | Karamcheti | |
| 9,588,977 B1 | 3/2017 | Wang | |
| 10,013,169 B2 | 7/2018 | Fisher | |
| 10,229,735 B1 | 3/2019 | Natarajan | |
| 10,235,198 B2 | 3/2019 | Qiu | |
| 2002/0010783 A1 | 1/2002 | Primak | |
| 2002/0039260 A1 * | 4/2002 | Kilmer | G11B 5/5521 360/264.7 |
| 2002/0073358 A1 | 6/2002 | Atkinson | |
| 2002/0161890 A1 | 10/2002 | Chen | |
| 2003/0074319 A1 | 4/2003 | Jaquette | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0103238 A1 | 5/2004 | Avraham | |
| 2004/0143718 A1 | 7/2004 | Chen | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0149827 A1 * | 7/2005 | Lambert | G11B 20/1883 714/770 |
| 2005/0174670 A1 * | 8/2005 | Dunn | G11B 5/09 360/48 |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0156012 A1 | 7/2006 | Beeson | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0283081 A1 | 12/2007 | Lasser | |
| 2007/0285980 A1 | 12/2007 | Shimizu | |
| 2008/0034154 A1 | 2/2008 | Lee | |
| 2008/0112238 A1 | 5/2008 | Kim | |
| 2008/0301532 A1 | 12/2008 | Uchikawa | |
| 2009/0113219 A1 | 4/2009 | Aharonov | |
| 2009/0282275 A1 | 11/2009 | Yermalayeu | |
| 2009/0307249 A1 | 12/2009 | Koifman | |
| 2009/0310412 A1 | 12/2009 | Jang | |
| 2010/0031000 A1 | 2/2010 | Flynn | |
| 2010/0169470 A1 | 7/2010 | Takashige | |
| 2010/0217952 A1 | 8/2010 | Iyer | |
| 2010/0229224 A1 | 9/2010 | Etchegoyen | |
| 2010/0241848 A1 | 9/2010 | Smith | |
| 2010/0321999 A1 | 12/2010 | Yoo | |
| 2010/0325367 A1 | 12/2010 | Kornegay | |
| 2011/0055458 A1 | 3/2011 | Kuehne | |
| 2011/0055471 A1 | 3/2011 | Thatcher | |
| 2011/0072204 A1 | 3/2011 | Chang | |
| 2011/0099418 A1 | 4/2011 | Chen | |
| 2011/0153903 A1 | 6/2011 | Hinkle | |
| 2011/0161784 A1 | 6/2011 | Selinger | |
| 2011/0191525 A1 | 8/2011 | Hsu | |
| 2011/0218969 A1 | 9/2011 | Anglin | |
| 2011/0231598 A1 | 9/2011 | Hatsuda | |
| 2011/0292538 A1 | 12/2011 | Haga | |
| 2011/0299317 A1 | 12/2011 | Shaeffer | |
| 2011/0302353 A1 | 12/2011 | Confalonieri | |
| 2012/0039117 A1 | 2/2012 | Webb | |
| 2012/0084523 A1 | 4/2012 | Littlefield | |
| 2012/0117399 A1 | 5/2012 | Chan | |
| 2012/0147021 A1 | 6/2012 | Cheng | |
| 2012/0159289 A1 | 6/2012 | Piccirillo | |
| 2012/0210095 A1 | 8/2012 | Nellans | |
| 2012/0233523 A1 | 9/2012 | Krishnamoorthy | |
| 2012/0246392 A1 | 9/2012 | Cheon | |
| 2012/0278579 A1 | 11/2012 | Goss | |
| 2012/0284587 A1 | 11/2012 | Yu | |
| 2013/0013880 A1 | 1/2013 | Tashiro | |
| 2013/0061029 A1 | 3/2013 | Huff | |
| 2013/0073798 A1 | 3/2013 | Kang | |
| 2013/0080391 A1 | 3/2013 | Raichstein | |
| 2013/0145085 A1 | 6/2013 | Yu | |
| 2013/0145089 A1 | 6/2013 | Eleftheriou | |
| 2013/0151759 A1 | 6/2013 | Shim | |
| 2013/0159251 A1 | 6/2013 | Skrenta | |
| 2013/0159723 A1 | 6/2013 | Brandt | |
| 2013/0166820 A1 | 6/2013 | Batwara | |
| 2013/0173845 A1 | 7/2013 | Aslam | |
| 2013/0191601 A1 | 7/2013 | Peterson | |
| 2013/0219131 A1 | 8/2013 | Alexandron | |
| 2013/0318283 A1 | 11/2013 | Small | |
| 2013/0318395 A1 | 11/2013 | Kalavade | |
| 2014/0019650 A1 | 1/2014 | Li | |
| 2014/0082273 A1 | 3/2014 | Segev | |
| 2014/0108414 A1 | 4/2014 | Stillerman | |
| 2014/0181532 A1 | 6/2014 | Camp | |
| 2014/0195564 A1 | 7/2014 | Talagala | |
| 2014/0233950 A1 | 8/2014 | Luo | |
| 2014/0250259 A1 | 9/2014 | Ke | |
| 2014/0279927 A1 | 9/2014 | Constantinescu | |
| 2014/0304452 A1 | 10/2014 | De La Iglesia | |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0106559 A1 | 4/2015 | Cho | |
| 2015/0142752 A1 | 5/2015 | Chennamsetty | |
| 2015/0227316 A1 | 8/2015 | Warfield | |
| 2015/0277937 A1 | 10/2015 | Swanson | |
| 2015/0294684 A1 * | 10/2015 | Qjang | G11B 20/1217 360/48 |
| 2015/0301964 A1 | 10/2015 | Brinicombe | |
| 2015/0304108 A1 | 10/2015 | Obukhov | |
| 2015/0363271 A1 | 12/2015 | Haustein | |
| 2015/0372597 A1 | 12/2015 | Luo | |
| 2016/0014039 A1 | 1/2016 | Reddy | |

(56) References Cited

U.S. PATENT DOCUMENTS

| | | |
|---|---|---|
| 2016/0026575 A1 | 1/2016 | Samanta |
| 2016/0048341 A1 | 2/2016 | Constantinescu |
| 2016/0098344 A1 | 4/2016 | Gorobets |
| 2016/0110254 A1 | 4/2016 | Cronie |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0167268 A1 | 6/2018 | Liguori |
| 2018/0189182 A1 | 7/2018 | Wang |
| 2018/0212951 A1 | 7/2018 | Goodrum |
| 2018/0270110 A1 | 9/2018 | Chugtu |
| 2018/0293014 A1 | 10/2018 | Ravimohan |
| 2018/0329776 A1 | 11/2018 | Lai |
| 2018/0336921 A1* | 11/2018 | Ryun ............... G11B 5/2655 |
| 2018/0349396 A1 | 12/2018 | Blagojevic |
| 2018/0356992 A1 | 12/2018 | Lamberts |
| 2018/0373428 A1 | 12/2018 | Kan |
| 2019/0012111 A1 | 1/2019 | Li |
| 2019/0073262 A1 | 3/2019 | Chen |
| 2019/0205206 A1 | 7/2019 | Hornung |
| 2019/0391748 A1* | 12/2019 | Li ................... G06F 12/0238 |

FOREIGN PATENT DOCUMENTS

| | | |
|---|---|---|
| WO | 9418634 | 8/1994 |
| WO | 1994018634 | 8/1994 |

OTHER PUBLICATIONS

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

* cited by examiner

METHOD AND SYSTEM FOR FACILITATING LOW-COST HIGH-THROUGHPUT STORAGE FOR ACCESSING LARGE-SIZE I/O BLOCKS IN A HARD DISK DRIVE

BACKGROUND

Field

This disclosure is generally related to the field of data storage. More specifically, this disclosure is related to a method and system for facilitating low-cost high-throughput storage for accessing large-size input/output (I/O) blocks in a hard disk drive a hard disk drive (HDD).

Related Art

Today, various storage systems are being used to store and access the ever-increasing amount of digital content. A storage system can include storage servers with one or more storage devices or drives, and a storage device or drive can include storage media with a non-volatile memory (such as a solid state drive (SSD) or a hard disk drive (HDD)). The need for low-cost high-capacity storage can be beneficial in certain technological fields, e.g., artificial intelligence and big data analysis. High-capacity HDDs are commonly used to fulfill the low-cost need, but constraints on throughput due to the mechanical characteristics of HDDs can limit the optimal usage of the high-capacity of these HDDs. For example, because of mechanical features of HDDs relating to seek time (e.g., read/write heads moving to a desired location on a track of a platter of an HDD) and the speed of the rotation of the platters (e.g., rounds per minute or RPM), the practical throughput of a high-capacity HDD may be limited to less than approximately 200 Megabytes (MB) per second. Thus, despite the continuing increase in the storage capacity of HDDs, the overall throughput may not increase at a similar pace. Furthermore, using a conventional file system and block layers to process data at the finer granularity of an I/O request may not optimize the efficiency and performance of an HDD, which can limit the flexibility and performance of the overall storage system.

Because of these limitations on the throughput of HDDs, current systems may use SSDs as storage drives, e.g., a high-density quad-level cell (QLC) NAND SSD. However, while such high-density SSDs may provide an increased latency and capacity, these high-density SSDs may also result in a decreased endurance. One technique is to place a high-endurance low-latency storage class memory as a persistent cache between the volatile system memory and the high-density NAND SSDs. However, this technique is constrained by several factors: over-qualification and suboptimal usage; an imbalance between read and write operations; limited use of multiple high-cost Peripheral Component Interconnect Express (PCIe) lanes; and ongoing endurance issues with SSD.

Thus, due to the mismatch between the increasing HDD capacity and the limited HDD throughput, and despite current solutions and techniques, the efficiency of low-cost high-throughput storage in a hard disk drive remains a challenge.

SUMMARY

One embodiment provides a system which facilitates operation of a storage system. During operation, the system receives a first request to write data to a hard disk drive (HDD) which comprises a plurality of platters with corresponding heads, wherein a respective platter includes a plurality of tracks. The system aligns the heads at a same first position on a first track of each platter. The system writes the data to the platters by distributing the data as a plurality of data sectors to track sectors located at the same first position on the first track of each platter.

In some embodiments, the system receives a second request to read the data from the HDD. The system identifies the first track as a location at which the data is stored. The system aligns the heads at a same random position on the first track of each platter. The system reads, during a single rotation of the platters and beginning from the same random position, all data stored on the first track of each platter. The system stores the read data in a data buffer. The system reshuffles the read data in the data buffer to obtain the data requested in the second request.

In some embodiments, the system receives a third request to read the data from the hard disk drive, wherein the data requested in the third request is stored in the first track of each platter. The system determines that the data requested in the third request is stored in the data buffer. The system retrieves the data requested in the third request from the data buffer without reading the data stored in the first track of each platter. The system returns the retrieved data.

In some embodiments, aligning the heads at the same first position or the same random position comprises activating a plurality of arms associated with the plurality of platters of the hard disk drive, wherein a respective arm is attached to a corresponding head of a respective platter. Writing the data to the platters by distributing the data as a plurality of data sectors is based on a logical block address associated with a respective data sector.

In some embodiments, a respective track includes a plurality of pre-allocated spare sectors for remapping data stored in a faulty sector of the respective track.

In some embodiments, the data buffer is maintained by the hard disk drive or a host, and reshuffling the read data in the data buffer is performed by the hard disk drive or the host.

In some embodiments, the system writes replicas of the data to other hard disk drives of a distributed storage system, wherein the replicas are written by distributing a respective replica as a plurality of data sectors to track sectors located at a same second position on a second track of each platter of a respective other hard disk drive. The system receives a third request to read the data stored in the distributed storage system. The system obtains a unique portion of the data requested in the third request from each of the hard disk drives on which the data or replicas of the data are stored. The system concatenates the unique portions in a correct order to form the data requested in the third request. The system returns the concatenated data in response to the third request.

In some embodiments, the unique portion of the data obtained from each of the hard disk drives is determined by a file system of the distributed storage system, and the concatenation of each unique portion comprises an entirety of the data requested in the third request.

BRIEF DESCRIPTION OF THE FIGURES

In the figures, like reference numerals refer to the same figure elements.

DETAILED DESCRIPTION

Figure 1:
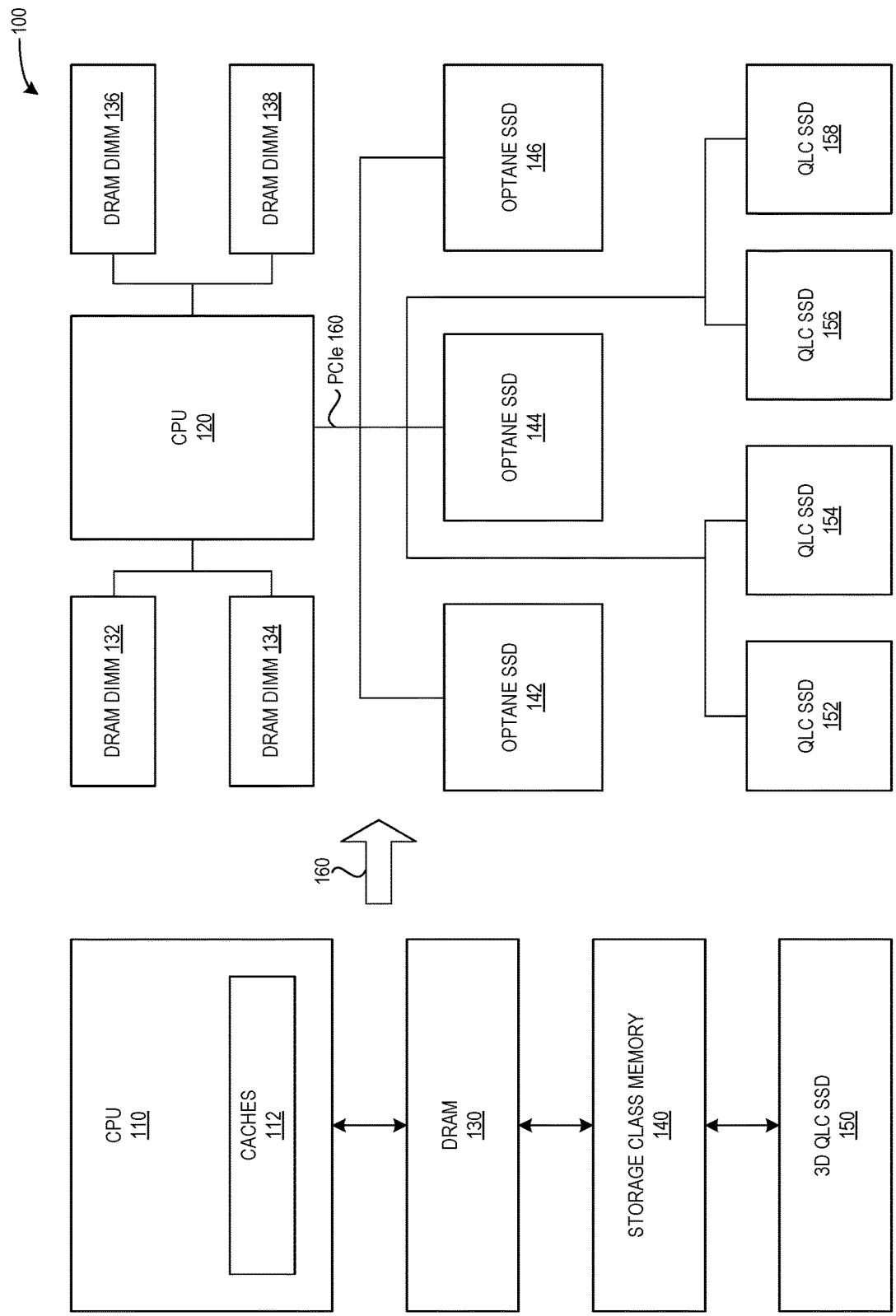
FIG. 1 illustrates an exemplary environment which facilitates operation of a storage system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a hard disk drive system which facilitates low-cost high-throughput storage for accessing large-size I/O blocks, by: sector remapping; distributing data across multiple platters at a same position in each platter; enhancing parallelism by reading portions of replicas from different storage drives; balancing traffic; and buffering data.

As described above, the need for low-cost high-capacity storage can be especially important in certain technological fields, e.g., artificial intelligence and big data analysis. High-capacity HDDs are commonly used to fulfill the low-cost need, but constraints on throughput due to the mechanical characteristics of HDDs can limit the optimal usage of the high-capacity of these HDDs. For example, because of mechanical features of HDDs relating to seek time (e.g., read/write heads moving to a desired location on a track of a platter of an HDD) and the speed of the rotation of the platters (e.g., rounds per minute or RPM), the practical throughput of a high-capacity HDD may be limited to less than approximately 200 Megabytes (MB) per second. Thus, despite the continuing increase in the storage capacity of HDDs, the overall throughput may not increase at a similar pace. Furthermore, using a conventional file system and block layers to process data at the finer granularity of an I/O request may not optimize the efficiency and performance of an HDD, which can limit the flexibility and performance of the overall storage system.

A current solution is to use an SSD as a storage drive. However, while SSDs may provide an increased latency and capacity, SSDs may also result in a decreased endurance. One technique is to place a high-endurance low-latency storage class memory as a persistent cache between the volatile system memory and a high-density NAND SSD, as described below in relation to FIG. 1. However, this technique is constrained by several factors: over-qualification and suboptimal usage; an imbalance between read operations and write operations; limited use of multiple high-cost PCIe lanes; and ongoing endurance issues with SSD.

Due to the mismatch between the increasing HDD capacity and the limited HDD throughput, and despite current solutions and techniques, the efficiency of low-cost high-throughput storage in a hard disk drive remains a challenge.

The embodiments described herein address this challenge and the above-described limitations by providing a hard disk drive system which provides several distinct and collaborating mechanisms. First, instead of allocating spare sectors as the most internal tracks of a platter (as in the conventional system), the described embodiments can pre-allocate spare sectors within each respective track of the platter, which can result in a decreased latency due to shorter distances moved by the read/write head. This sector remapping is described below in relation to FIGS. 2A and 2B.

Second, in the described embodiments, the system can activate all of the HDD platters at once, rather than only one platter at a time. Because the multiple N arms of an HDD share a same actuator, the N arms can move together as one and access (i.e., read from or write to) each of their respective N platters at a given time. For example, the system can write data, as a plurality of data sectors, to track sectors located at a same position on a given track of each platter. This can result in an increase in the parallelism for read/write accesses from 1 to N, as described below in relation to FIG. 3

Third, replicas of data may be stored on different hard disk drives of a same server or of different servers. In the described embodiments, the system can read unique portions of requested data from each respective replica, which can result in a more efficient balancing of the read traffic. This can also result in an improved overall throughput, as described below in relation to FIG. 4.

Fourth, to perform a read request of data, instead of moving the read/write head to both a single specific track and a single sector on the specific track (as in the conventional system), the embodiments described herein can move the read/write head to a random position on the identified respective track of all platters (as described above). The system can read, during a single rotation of the platter and beginning from the same random position on each respective track, all data stored on the each respective track at which the data is stored. The system can store all the read data in a data buffer, and subsequently reshuffle the stored data as needed to obtain the requested data. This also allows for a faster execution of subsequent I/O operations which need to access the data stored in any of the respective tracks. Instead of reading a single sector from a single track, the system can read all tracks at once, align the data, and store the aligned data in the read buffer for faster retrieval, as described below in relation to FIG. 5.

Thus, by increasing the size of the I/O block in the manner described herein, the system can provide an improved support for applications which may require high-throughput without regard for the I/O size. For example, in the fields of artificial intelligence and big data analysis, a tremendous volume of data must be moved back and forth between memory and storage. The majority of the computation is handled by the processors and the memory, while the persistent data storage requires data transfer at a high-throughput rate without being affected by the size of the I/O itself. The embodiments described herein provide an improved hard disk drive system which can more efficiently use high-capacity HDDs (i.e., optimize the usage) with an enhanced throughput (e.g., via sector remapping, distributed data placement, enhanced parallelism, balancing traffic, and buffering data). These mechanisms can result in a more efficient overall storage system. Furthermore, the described embodiments can be used to move and replicate data with high-throughput, which can make the process of migrating a large amount of data in a data center more efficient.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device. A storage system can also be a computer system.

A "computing device" refers to any server, device, node, entity, drive, or any other entity which can provide any computing capabilities.

The term "hard disk drive system" refers to a system which can store data on at least a hard disk drive.

The terms "block size" and "I/O block size" refer to the size of a data portion (block) associated with a single read or write operation.

Exemplary Operation of a Storage System in the Prior Art

As described above, the need for low-cost high-capacity storage can be especially important in certain technological fields, e.g., artificial intelligence and big data analysis. While high-capacity HDDs are commonly used to fulfill the low-cost need, constraints on throughput due to HDD mechanical characteristics can limit the optimal usage of these high-capacity HDDs. One current solution is to use SSDs as a storage drive. However, while SSDs may provide an increased latency and capacity, SSDs may also result in a decreased endurance. One technique is to place a high-endurance low-latency storage class memory as a persistent cache between the volatile system memory and a high-density NAND SSD. However, this technique is also constrained by several limitations, as described below in relation to FIG. 1.

FIG. 1 illustrates an exemplary environment 100 which facilitates operation of a storage system, in accordance with the prior art. Environment 100 can include a tiered storage system (on the left side of a thick arrow 160), and an implementation of such a tiered storage system (on the right side of thick arrow 160). The tiered storage system can include: a central processing unit (CPU) (which can include caches 112); a dynamic random access memory (DRAM) 130; a storage class memory 140; and a high-capacity Quad-Level Cell (QLC) SSD, such as a 3D QLC SSD 150.

The exemplary implementation of the tiered storage system can include: a CPU 120; DRAM dual in-line memory modules (DIMMs) 132, 134, 136, and 138; Optane SSDs 142, 144, and 146; and QLC SSDs 152, 154, 156, and 158. CPU 120 can communicate with DRAMs 132-138. CPU 120 can also communicate with Optane SSDs 142-146 and QLC SSDs 152-158 via multiple PCIe lanes 170.

While the tiered storage system depicted in environment 100 may provide a high-throughput, the following factors may limit this tiered storage system. First, the system may be designed to handle workloads with a large I/O size, e.g., 1 Megabyte (MB). In order to meet a corresponding high-throughput requirement (e.g., of 500 MB/sec) of such large workloads, the tiered storage system may be overqualified. That is, the tiered storage system may provide too much power in some instances, and may thus result in a suboptimal usage. Second, an imbalance may exist between read and write operations, i.e., the write latency may be much lower than the read latency. The tiered storage system may write data into Optane SSDs 142-146 with a much lower latency than the latency involved for retrieving or reading data from QLC SSDs 152-158.

Third, in ordered to provide the required high capacity for storage, the tiered storage system may include a significant number of both Optane SSDs and QLC SSDs. However, all of these devices/components require and share resources from the multiple PCIe lanes (e.g., via PCIe 170), which can be expensive in terms of financial cost and performance. Moreover, constraints due to CPU 120 may limit the number of drives that may be serviced via the multiple PCIe lanes. Thus, the overall cost may increase significantly based on the consumption of the multiple PCIe lanes.

Fourth, both Optane SSDs and QLC SSDs have an individual data write per day (DWPD) performance, which can limit the endurance of the physical media itself. The endurance of the physical media can affect both the lifespan and performance stability, which are critical features of the overall storage system. These ongoing endurance issues related to SSDs remain a challenge.

Thus, all of these constraints can limit the flexibility and performance of the overall storage system.

Exemplary Allocation of Spare Sectors: Prior Art v. One Embodiment

Figure 2B:
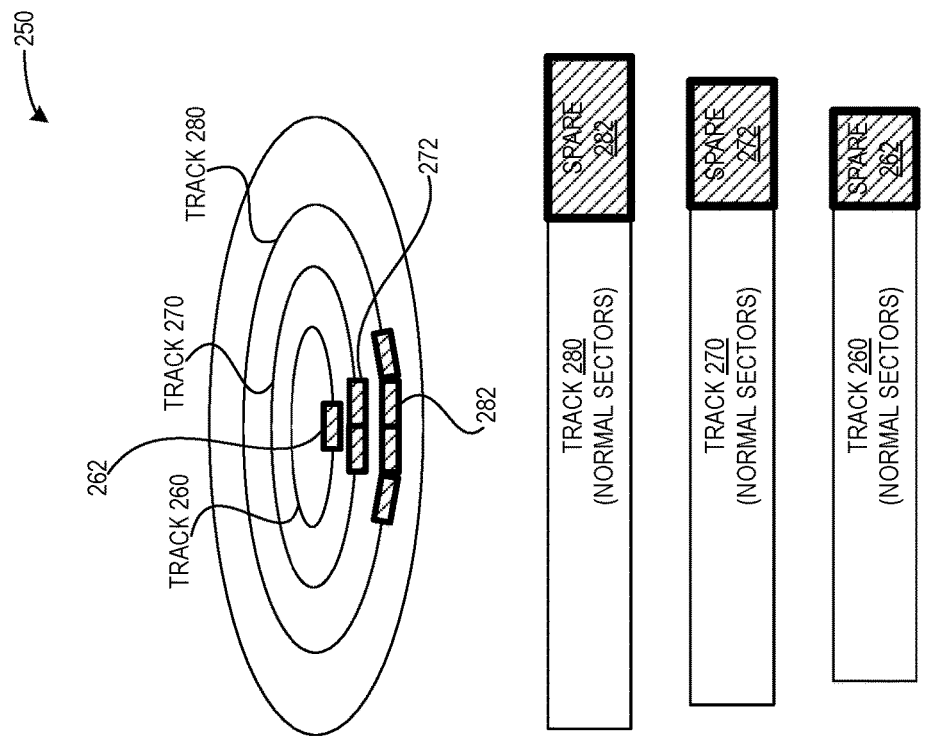
FIG. 2B illustrates an exemplary environment for allocating spare sectors, in accordance with an embodiment of the present application.
Figure 2A:
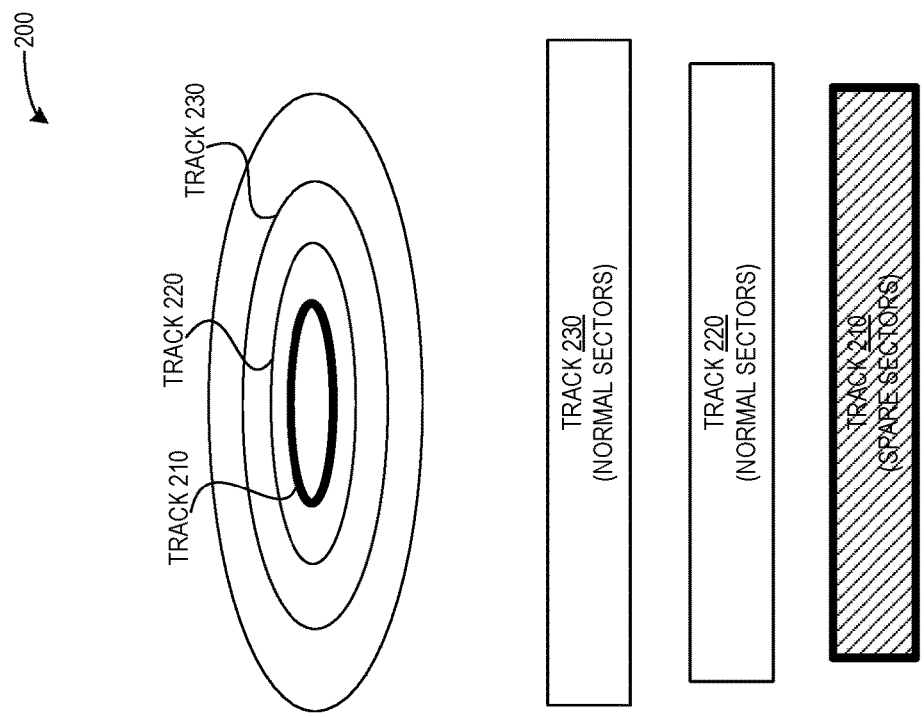
FIG. 2A illustrates an exemplary environment for allocating spare sectors, in accordance with the prior art.

FIG. 2A illustrates an exemplary environment 200 for allocating spare sectors, in accordance with the prior art. Environment 200 can depict an HDD platter 200 with a plurality of tracks, such as tracks 210, 220, and 230. In this conventional environment, the system uses internal tracks as spare sectors. For example, internal track 210 (indicated by a thick line in platter 200) may be designed or allocated as spare sectors (also as indicated by the left-slanting diagonal lines in the rectangular bar corresponding to track 210). Tracks 220 and 230 can include "normal sectors," i.e., sectors that are used for storing data (as indicated by the non-filled rectangular bars corresponding to tracks 220 and 230).

If an error is detected while using or accessing a certain portion of one normal track (e.g., a "faulty sector" of track 230), any data stored in the faulty sector can be moved or copied to the spare sectors of track 210. However, this requires moving the read/write head from the faulty sector of track 230 to the appropriate sectors of track 210, which can result in an increased access latency with additional seek time and head alignments.

The embodiments of the present application address the issues associated with prior art environment 200 of FIG. 2A by pre-allocating spare sectors in each track at the beginning of the track. FIG. 2B illustrates an exemplary environment 250 for allocating spare sectors, in accordance with an embodiment of the present application. Environment 250 can depict an HDD platter 250 with a plurality of tracks, such as tracks 260, 270, and 280. Each respective track can include a plurality of pre-allocated spare sectors for remapping data stored in a faulty sector of the respective track. For example: track 260 can include both normal sectors (indicated by the non-filled rectangular bar corresponding to track 260) and spare sectors 262 (as indicated by the left-slanting diagonal lines in the rectangular bar corresponding to track 260); track 270 can include both normal sectors and spare sectors 272; and track 280 can include both normal sectors and spare sectors 282. Note that while the spare sectors are depicted at the end of each indicated rectangular bar, the spare sectors may be pre-allocated at the beginning, at the end, or at any location in a given track.

Thus, by placing and pre-allocating spare sectors on each respective track, the described embodiments can save time in remapping a certain faulty sector in a given track by only moving the head to the spare sectors in the given track. As a result, the system can avoid moving the head between the given track and internal (spare sector) tracks. This can provide an improved performance in the access latency of the HDD as the HDD no longer needs to spend time on moving the head back and forth between the given track and the different internal spare sector tracks.

Exemplary Data Placement in a High-Density HDD

Another mechanism of the described embodiments allows the system to activate all of the HDD platters at once, rather than just a single platter at a time. The system can modify the data placement to write data to track sectors located at a same position on a given track of each platter, which can result in an increase in the parallelism for read/write accesses, as described below in relation to FIG. 3.

Figure 3:
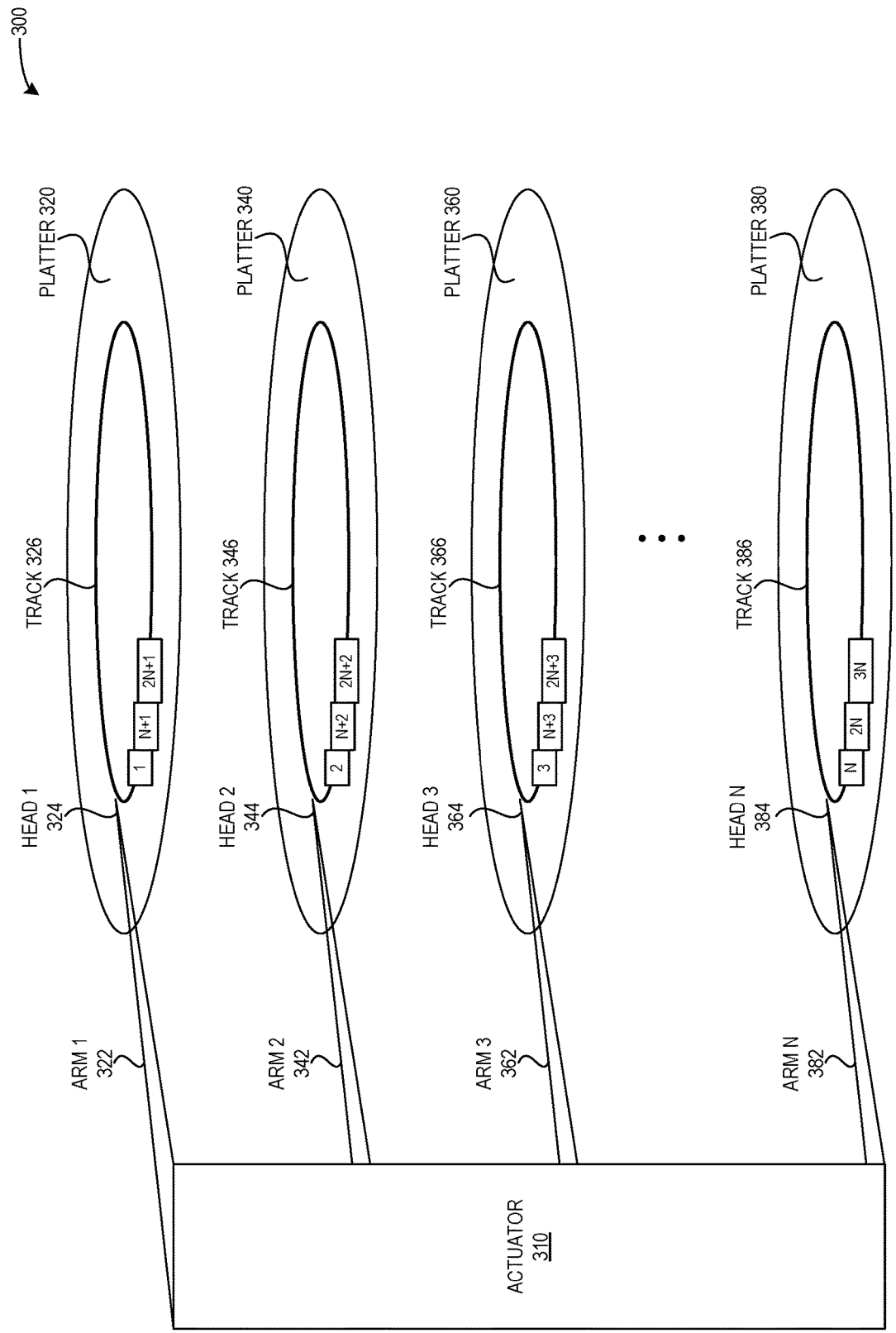
FIG. 3 illustrates an exemplary high-density HDD with an increased parallelism, including a mechanism for placing data across a respective track of multiple platters at a similar time, in accordance with an embodiment of the present application.

FIG. 3 illustrates an exemplary high-density HDD 300 with an increased parallelism, including a mechanism for placing data across a respective track of multiple platters at a similar time, in accordance with an embodiment of the present application. HDD 300 can include a plurality of platters 320, 340, 360, and 380. HDD 300 can also include an actuator 310 with multiple arms, where each arm has an attached read/write head which corresponds to a respective platter. For example: an arm 1 322 has a head 1 324 which corresponds to platter 320; an arm 2 342 has a head 2 344 which corresponds to platter 340; an arm 3 362 has a head 3 364 which corresponds to platter 360; and an arm N 382 has a head N 384 which corresponds to platter 380. Because the multiple N arms (i.e., arm 1 322 to arm N 382) share a single actuator (e.g., actuator 310), the N arms can move together as one, and can read/write to each of their respective N platters at or about the same time (e.g., simultaneously or nearly simultaneously).

Thus, the system can write to a same sector of a given track of each platter at essentially the same time, e.g., to the current aligned physical locations of tracks in all of the platters. That is, at a given time, the system can write data to the platters of HDD 300 by distributing the data as a plurality of data sectors to track sectors located at a same first position on a track of each platter. For example, at a time t0, the system can align the heads at a same first position on a track of each platter. The system can then write, at essentially the same time: a sector 1 of the data to a first sector of a track 326 of platter 320; a sector 2 of the data to a first sector of a track 346 of platter 340; a sector 3 of the data to a first sector of a track 366 of platter 360; and a sector N of the data to a first sector of a track 386 of platter 380. As the platter continues to spin or rotate, the position of the N heads on each of the respective N platter moves to the same next location. At a time t1, the system can continue to write, at essentially the same time: a sector N+1 of the data to a second sector of track 326 of platter 320; a sector N+2 of the data to a second sector of track 346 of platter 340; a sector N+3 of the data to a second sector of track 366 of platter 360; and a sector 2N of the data to a second sector of track 386 of platter 380.

As the platter continues to spin or rotate, the position of the N heads on each of the respective N platter moves to the same next location. At a time t2, the system can continue to write, at essentially the same time: a sector 2N+1 of the data to a third sector of track 326 of platter 320; a sector 2N+2 of the data to a third sector of track 346 of platter 340; a sector 2N+3 of the data to a third sector of track 366 of platter 360; and a sector 3N of the data to a third sector of track 386 of platter 380.

Thus, the system can write the data by distributing the data as a plurality of data sectors, based on a logical block address associated with a respective data sector, to track sectors at a given same location on a track of each of the N platters. This can provide an increase in parallelism from 1 to N. At any moment, the system can write N sectors. Moreover, the system can read N sectors in parallel, thus increasing both the read and the write parallelism.

Exemplary Traffic Balancing in a Read Operation from Multiple Replicas

In a conventional distributed file system, multiple replicas of data may be stored on multiple drives of the same server or of different servers. In order to execute a read request, the conventional system can randomly choose one replica to read from a single drive. However, this may result in the performance of a particular product being reliant upon the throughput of the single drive.

The embodiments described herein provide a mechanism which can implement an even partition of a read request across the multiple copies, which can result in an improvement in the throughput of a read operation and eliminate the reliance on the throughput of a single drive. Moreover, the traffic may be distributed more evenly and predictably, which can result in a more efficient overall storage system.

Figure 4:
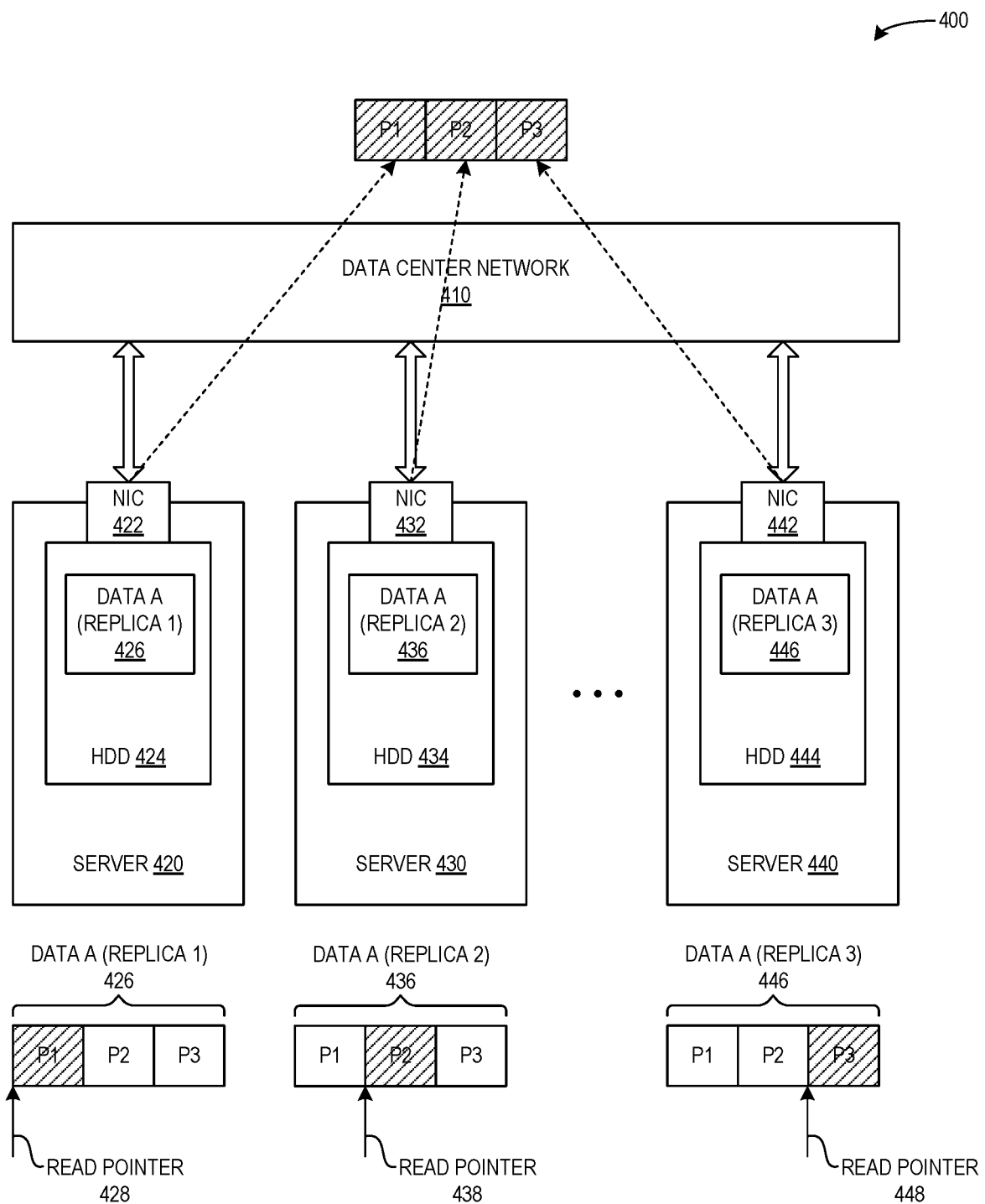
FIG. 4 illustrates an exemplary environment for facilitating an improvement in throughput, including balancing data traffic in a read operation from multiple replicas, in accordance with an embodiment of the present application.

FIG. 4 illustrates an exemplary environment 400 for facilitating an improvement in throughput, including balancing data traffic in a read operation from multiple replicas, in accordance with an embodiment of the present application. Environment 400 can include a data center network 410, which can receive data to be written to one of servers 420, 430, or 440, via a respective network interface card (NIC) 422, 432, or 442. The system can store a replica of the data (e.g., "Data A") in a storage drive associated with one of servers 420-440. For example: Data A (replica 1) 426 can be stored in HDD 424 of server 420; Data A (replica 2) 436 can be stored in HDD 434 of server 430; and Data A (replica 3) 446 can be stored in HDD 444 of server 440.

Upon receiving a request to read Data A, the system can simultaneously read the three replicas of Data A from different starting points. For example, the system can read a first portion "P1" from Data A (replica 1) 426 from HDD 424, starting from a read pointer 428. At the same or essentially the same time, the system can also read a second portion "P2" from Data A (replica 2) 436 from HDD 434, starting from a read pointer 438, and can also read a third portion "P3" from Data A (replica 3) 446 from HDD 444, starting from a read pointer 448. These read portions can all be unique portions of Data A, which allows the system to then concatenate the retrieved portions P1, P2, and P3, in a correct order, to form the requested Data A. The file system can manage the location of the read pointers, or determine these locations in advance upon storing the data as the three replicas (426, 436, and 446) to the different HDDs (424, 434, and 444) of servers 420, 430, and 440.

Thus, the implementation of reading unique portions from the multiple replicas in parallel can result in an improved performance of the overall storage system.

Buffering Data in an Exemplary Read Operation

Generally, in order to execute a read operation, a conventional hard disk drive reads a particular sector or sectors from a particular track, which can result in many rounds of reading in order to obtain all the sectors which comprise the requested read data. For example, given six separate read requests (e.g., I/O 1 through I/O 6), in order to execute an I/O 1 read request, an HDD must first move the head to the correct track. Because the head may not be currently located at the desired location in the correct track, the platter must rotate or spin once in order to read I/O 2 from the desired location in the correct track. The head can pick up the signal from the desired location in the correct track, and return the requested data for the I/O read request. Subsequently, in order to execute I/O 2 through I/O 6 read requests, the system must repeat the above procedure for each of I/O 2 through I/O 6, even if I/O 2 through I/O 6 are located on the same track as I/O 1. Performing these multiple operations can result in an increased latency and a decreased efficiency.

The embodiments described herein provide a mechanism which improves the above-described latency involved in read operations. The mechanism includes a read buffer which works with the physical actuation of all arms of all platters in a same location, as described above in relation to FIG. 3. The system can align the heads in any random position on a track on which a portion of the requested data is stored, and instead of reading once from the platter in a single operation of multiple operations, the system can read all the tracks from all the platters at once (starting from the same random position on each track), and write the read data to a data buffer. Subsequently, the system can reshuffle the data in the data buffer to obtain the requested data.

Furthermore, applications running on the host side may be designed to have concentrated reads that may occur in the same or nearby data chunks which are stored in a group of tracks, e.g., from the N platters of the HDD, as in FIG. 2. Thus, by placing the data read on a single rotation from a given track of all platters, and placing the read data in an accessible data buffer for reshuffling, the system can provide data to be subsequently retrieved at a lower latency, and can further save on the consumption of power from repeated reads of the same track (as in the conventional hard disk drive). That is, the system can perform a single operation to retrieve all the data from corresponding tracks, which avoids the need to perform multiple operations to retrieve the requested data from the same corresponding tracks.

Figure 5:
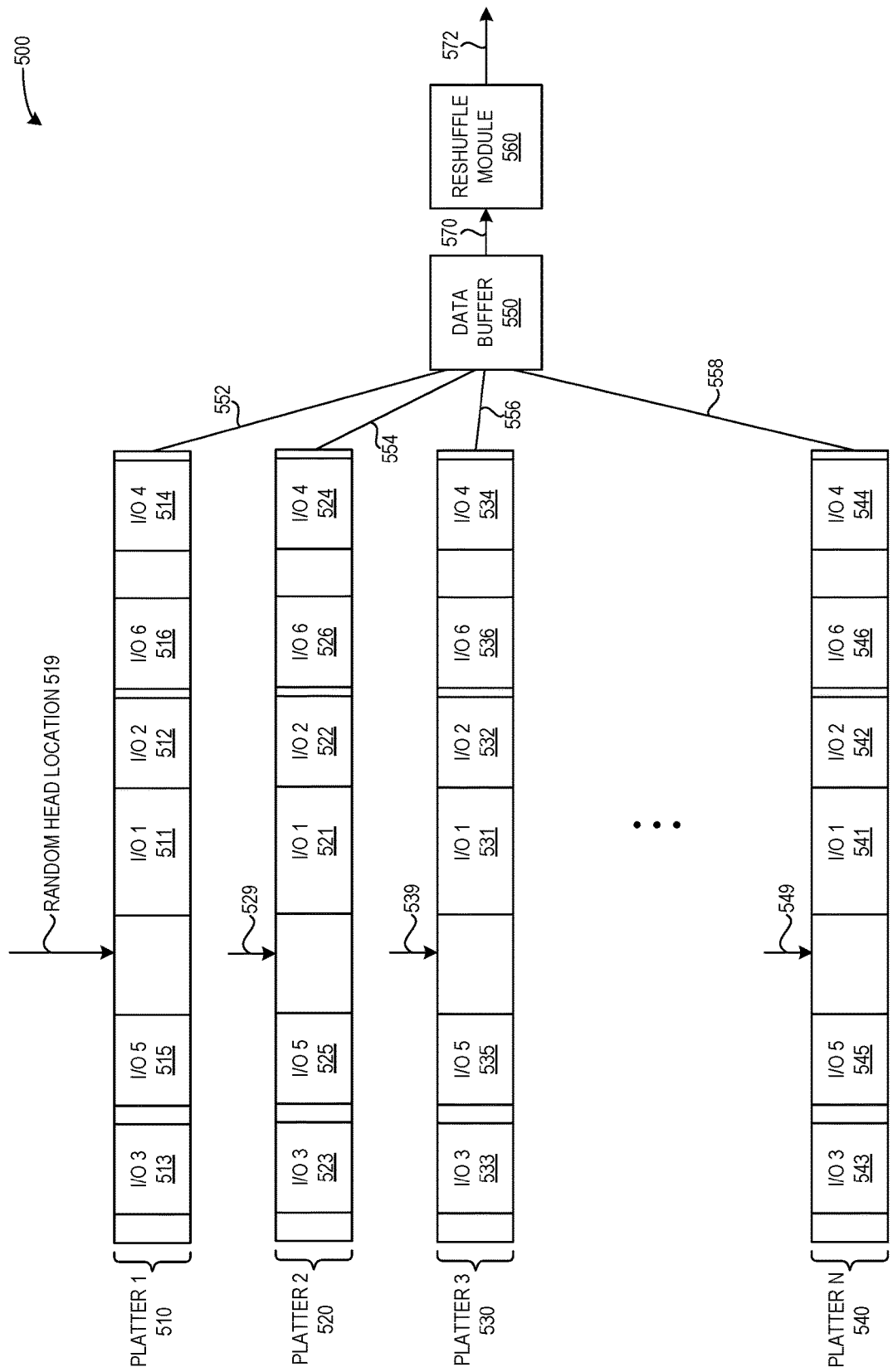
FIG. 5 depicts an exemplary mechanism for improving the performance of a read operation, including buffering data read from multiple platters, in accordance with an embodiment of the present application.

FIG. 5 depicts an exemplary mechanism 500 for improving the performance of a read operation, including buffering data read from multiple platters, in accordance with an embodiment of the present application. Given a plurality of N platters, the system can align the read/write heads corresponding to each respective platter to a random head location, e.g.: a random head location 519 on a platter 1 510; a random head location 529 on a platter 2 520; a random head location 539 on a platter 3 530; and a random head location 549 on a platter N 540. Each random head location may occur on a similarly located track of each respective platter, and each respective platter can include data corresponding to I/O 1 through I/O 6. For example, platter 1 510 can include the following data portions: an I/O 3 513; an I/O 5 515; an I/O 1 511; an I/O 2 512; an I/O 6 516; and an I/O 4 514. Each of the other platters (520, 530, and 540) can also include the same corresponding data portions, which were written to the platter in the manner described above in relation to FIG. 2.

The system can pick a same random location (i.e., 519, 529, 539, and 549) at which to place the read/write heads, and read, during a single rotation and beginning from the same random location, all data stored on the given track of each respective platter. The system can store all of the read data in a data buffer 550 (e.g., via communications 552, 554, 556, and 558). The data can be transmitted to and received by a reshuffle module 560 (via a communication 570). Reshuffle module 560 can reshuffle the data in the data buffer, e.g., by organizing the data to obtain data corresponding to a request from a host. Reshuffle module 560 can return the requested data to a host or other entity (via a communication 572). The data buffer and the reshuffle module may reside in the hard disk drive (e.g., as part of the HDD controller), in another component of the hard disk drive storage system, or in the host.

Thus, the system can provide another improvement to the performance of a hard disk drive system, where the improvement includes both the increased latency in retrieval and the savings in power consumption by eliminating repeated reads. The system provides this improvement based on reading all the data from the given track of all platters during a single rotation, storing the read data in the data buffer, and making the data in the data buffer available for subsequent retrieval directly from the data buffer.

Method for Facilitating Operation of a Storage System

Figure 6A:
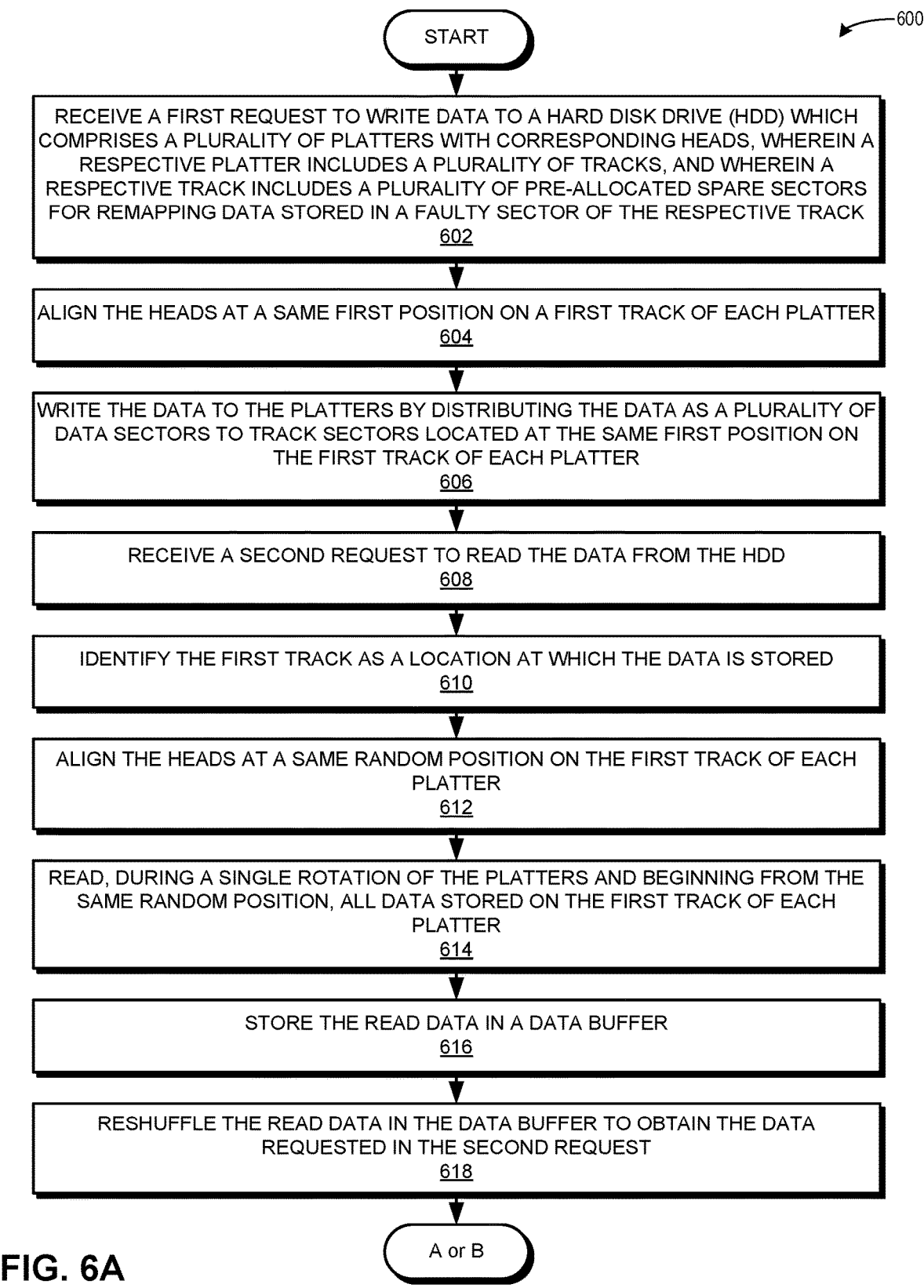
FIG. 6A presents a flowchart illustrating a method for facilitating operation of a storage system, including a write operation, in accordance with an embodiment of the present application.

FIG. 6A presents a flowchart 600 illustrating a method for facilitating operation of a storage system, including a write operation, in accordance with an embodiment of the present application. During operation, the system receives a first request to write data to a hard disk drive (HDD) which comprises a plurality of platters with corresponding heads, wherein a respective platter includes a plurality of tracks, and wherein a respective track includes a plurality of pre-allocated spare sectors for remapping data stored in a faulty sector of the respective track (operation 602). The system aligns the heads at a same first position on a first track of each platter (operation 604). The system writes the data to the platters by distributing the data as a plurality of data sectors to track sectors located at the same first position on the first track of each platter (operation 606).

The system receives a second request to read the data from the HDD (operation 608). The system identifies the first track as a location at which the data is stored (operation 610). The system aligns the heads at a same random position on the first track of each platter (operation 612). The system reads, during a single rotation of the platters and beginning from the same random position, all data stored on the first track of each platter (operation 614). The system stores the read data in a data buffer (operation 616). The system reshuffles the read data in the data buffer to obtain the data requested in the second request (operation 618). The operation continues at either Label A of FIG. 6B or Label B of FIG. 6C.

Figure 6B:
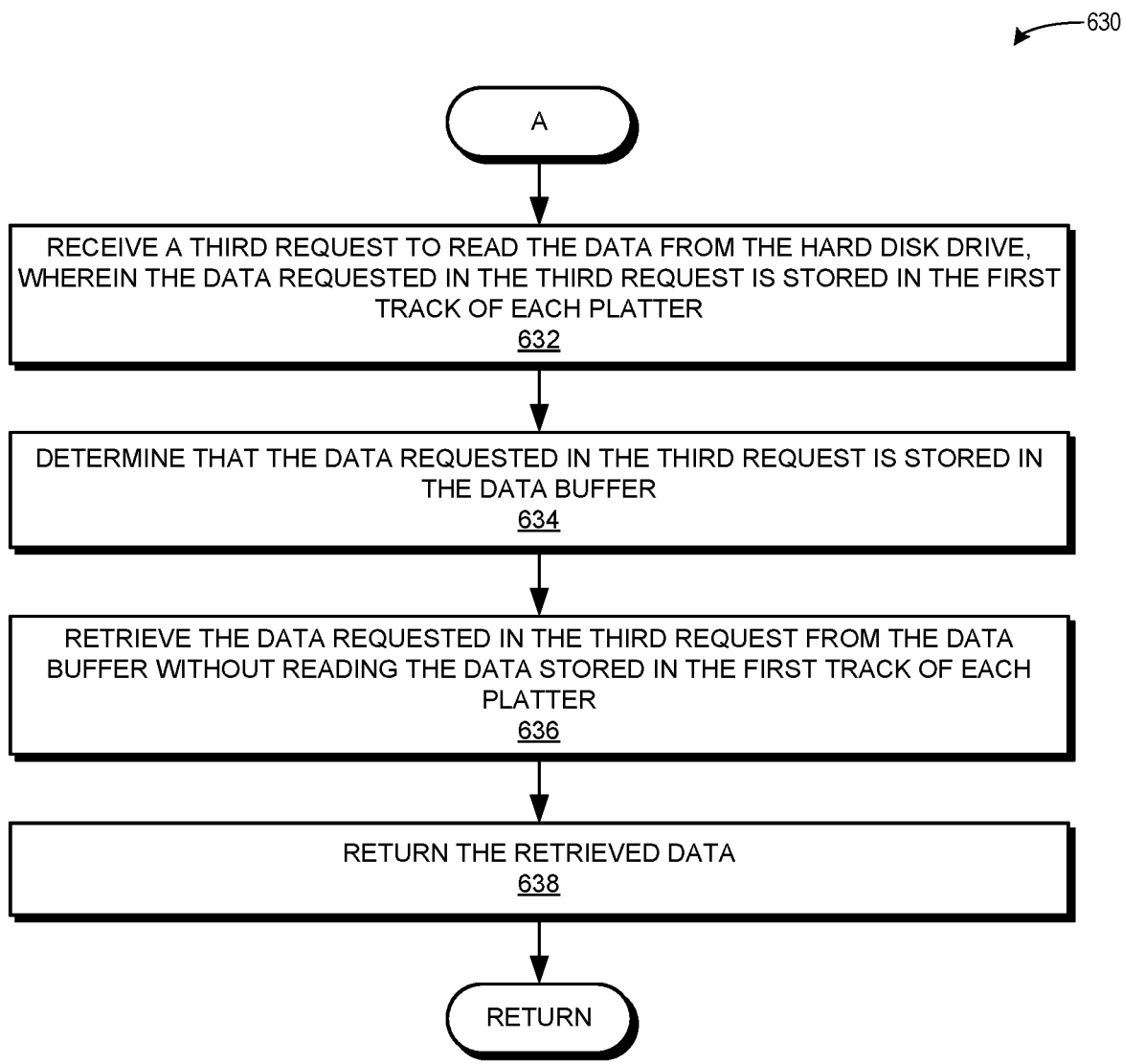
FIG. 6B presents a flowchart illustrating a method for facilitating operation of a storage system, including a read operation, in accordance with an embodiment of the present application.

FIG. 6B presents a flowchart 630 illustrating a method for facilitating operation of a storage system, including a read operation, in accordance with an embodiment of the present application. During operation, the system receives a third request to read the data from the hard disk drive, wherein the data requested in the third request is stored in the first track of each platter (operation 632). The system determines that the data requested in the third request is stored in the data buffer (operation 634). The system retrieves the data requested in the third request from the data buffer without reading the data stored in the first track of each platter (operation 636). In some embodiments, the system may also organize the data stored in the data buffer upon determining that the data requested in the third request is stored in the data buffer, or after retrieving all of the data in the data buffer. The system returns the retrieved data (operation 638).

Figure 6C:
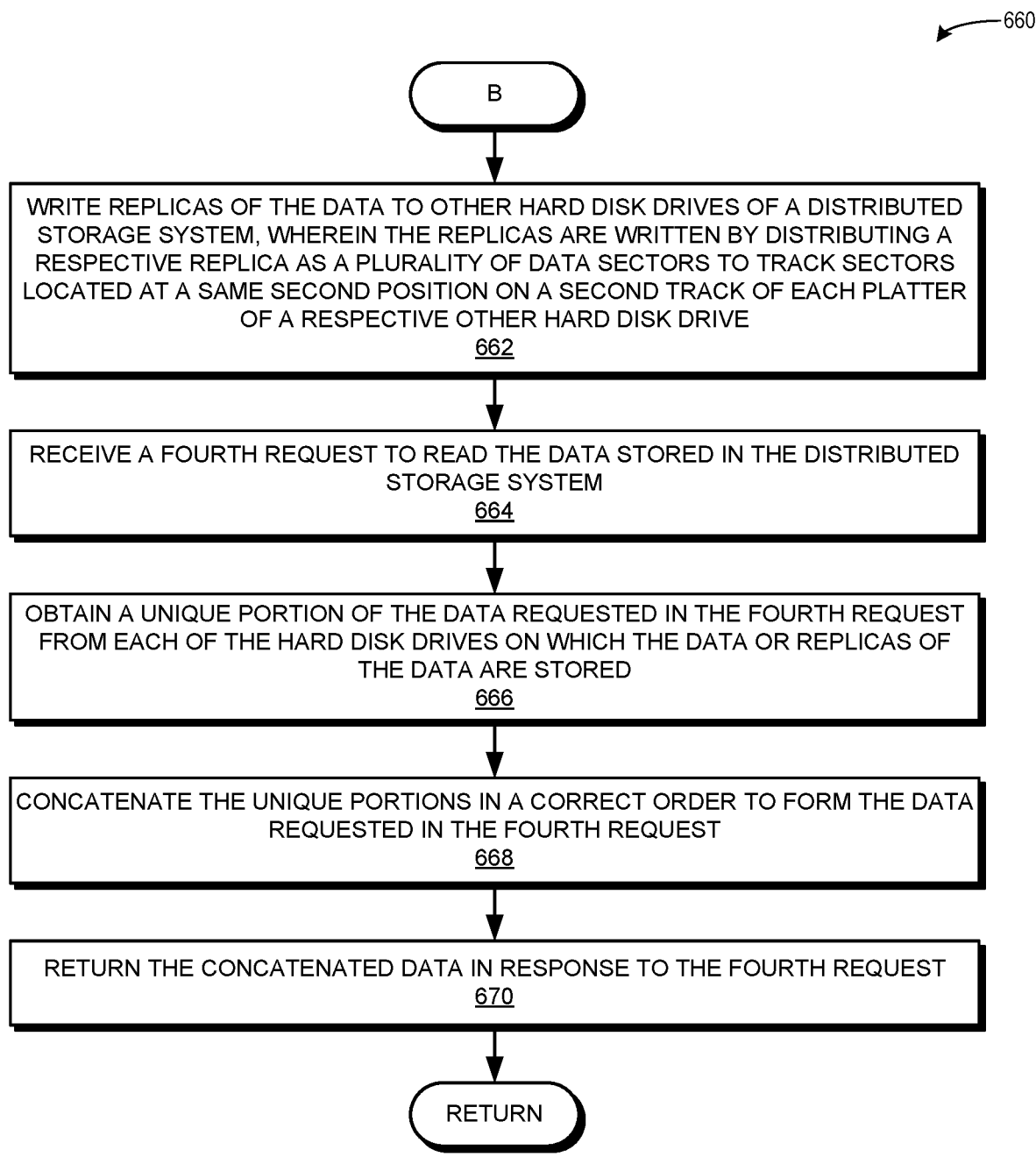
FIG. 6C presents a flowchart illustrating a method for facilitating operation of a storage system, including a read operation in a distributed system storing multiple replicas, in accordance with an embodiment of the present application.

FIG. 6C presents a flowchart 660 illustrating a method for facilitating operation of a storage system, including a read operation in a distributed system storing multiple replicas, in accordance with an embodiment of the present application. During operation, the system writes replicas of the data to other hard disk drives of a distributed storage system (e.g., a distributed file system), wherein the replicas are written by distributing a respective replica as a plurality of data sectors to track sectors located at a same second position on a second track of each platter of a respective other hard disk drive (operation 662). The system receives a fourth request to read the data stored in the distributed storage system (operation 664). The system obtains a unique portion of the data requested in the fourth request from each of the hard disk drives on which the data or replicas of the data are stored (operation 666). The system concatenates the unique portions in a correct order to form the data requested in the fourth request (operation 668). The system returns the concatenated data in response to the fourth request (operation 670).

Exemplary Computer System and Apparatus

Figure 7:
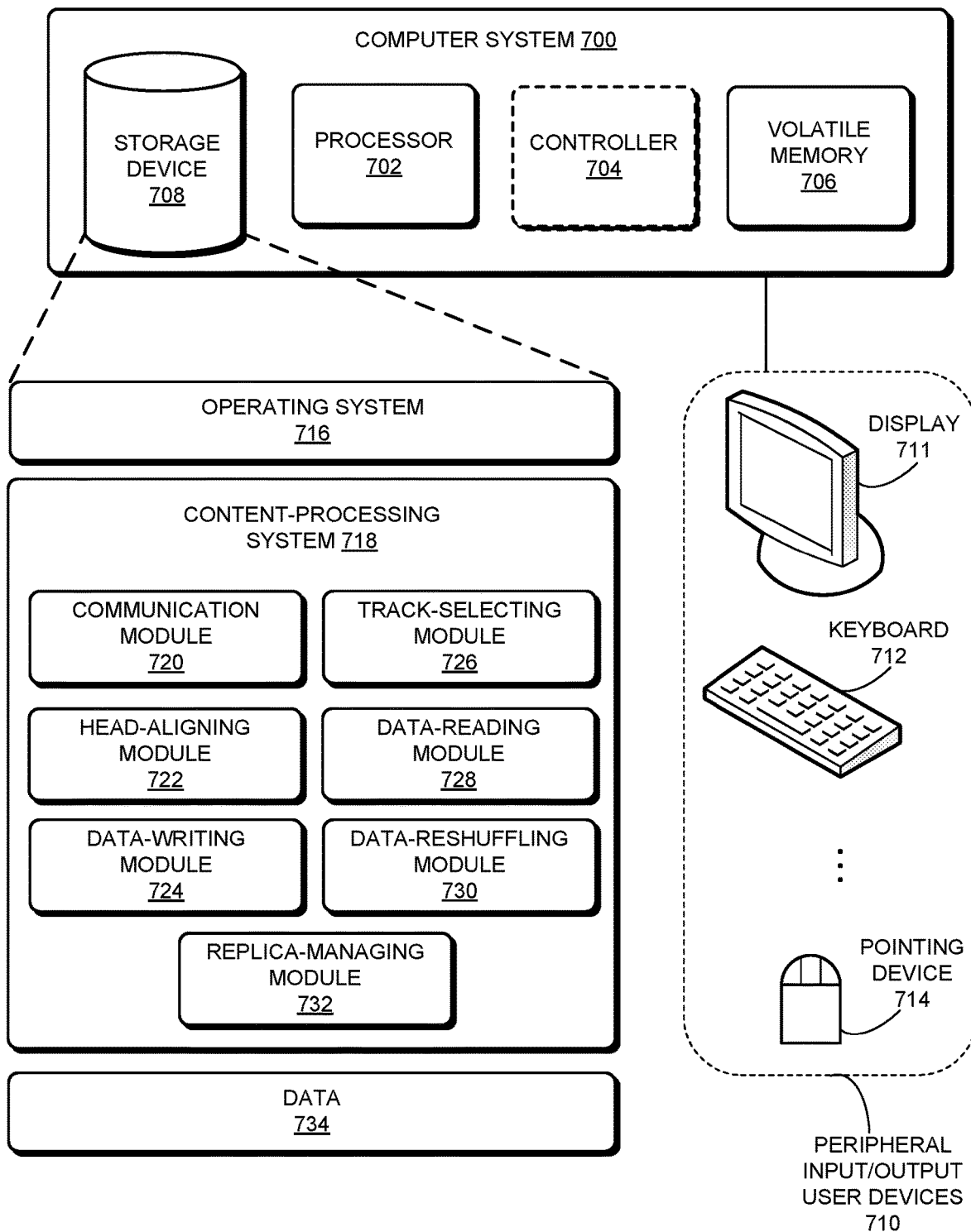
FIG. 7 illustrates an exemplary computer system that facilitates operation of a storage system, in accordance with an embodiment of the present application.

FIG. 7 illustrates an exemplary computer system 700 that facilitates operation of a storage system, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). In some embodiments, storage device 708 can correspond to HDD 300 of FIG. 3 or HDDs 424, 434, or 444 of FIG. 4, and controller 704 may reside in a respective HDD. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700, processor 702, or controller 704 to perform methods and/or processes described in this disclosure. In some embodiments, controller 704 may comprise modules 720-730 depicted in FIG. 7, and controller 704 may be configured to perform the methods and/or processes described as performed by modules 720-730. Specifically, content-processing system 718 can include instructions for receiving and transmitting data packets, including data to be read or written and an input/output (I/O) request (e.g., a read request or a write request) (communication module 720).

Content-processing system 718 can further include instructions for receiving a first request to write data to a hard disk drive (HDD) which comprises a plurality of platters with corresponding heads, wherein a respective platter includes a plurality of tracks, and wherein a respective track includes a plurality of pre-allocated spare sectors for remapping data stored in a faulty sector of the respective track (communication module 720). Content-processing system 718 can include instructions for aligning the heads at a same first position on a first track of each platter (head-aligning module 722). Content-processing system 718 can include instructions for writing the data to the platters by distributing the data as a plurality of data sectors to track sectors located at the same first position on the first track of each platter (data-writing module 724).

Content-processing system 718 can additionally include instructions for receiving a second request to read the data from the HDD (communication module 720). Content-processing system 718 can include instructions for identifying the first track as a location at which the data is stored (track-selecting module 726). Content-processing system 718 can include instructions for aligning the heads at a same random position on the first track of each platter (head-aligning module 722). Content-processing system 718 can also include instructions for reading, during a single rotation of the platters and beginning from the same random position, all data stored on the first track of each platter (data-reading module 728). Content-processing system 718 can include instructions for storing the read data in a data buffer (data-writing module 724). Content-processing system 718 can include instructions for reshuffling the read data in the data buffer to obtain the data requested in the second request (data-reshuffling module 730).

Content-processing system 718 can further include instructions for writing replicas of the data to other hard disk drives of a distributed storage system, wherein the replicas are written by distributing a respective replica as a plurality of data sectors to track sectors located at a same second position on a second track of each platter of a respective other hard disk drive (data-writing module 724 and replica-managing module 732). Content-processing system 718 can include instructions for receiving a third request to read the data stored in the distributed storage system (communication module 720). Content-processing system 718 can include instructions for obtaining a unique portion of the data requested in the third request from each of the hard disk drives on which the data or replicas of the data are stored (replica-managing module 732 and data-reading module 728). Content-processing system 718 can include instructions for concatenating the unique portions in a correct order to form the data requested in the third request (replica-managing module 732 and data-reading module 728). Content-processing system 718 can include instructions for returning the concatenated data in response to the third request (communication module 720).

Data 734 can include any data that is required as input or generated as output by the methods and/or processes described in this disclosure. Specifically, data 734 can store at least: data; a request; a read request; a write request; an input/output (I/O) request; data or metadata associated with a read request, a write request, or an I/O request; a physical block address (PB A); a logical block address (LBA); an indicator of a platter, a track, a sector, a spare sector, or a position on a track of a platter; a position on a track of a platter; a data sector; a track sector; a replica; a portion of a replica; a unique portion of data; concatenated portions of data; an order for concatenating portions of data; and an indicator of a hard drive or a server.

Figure 8:
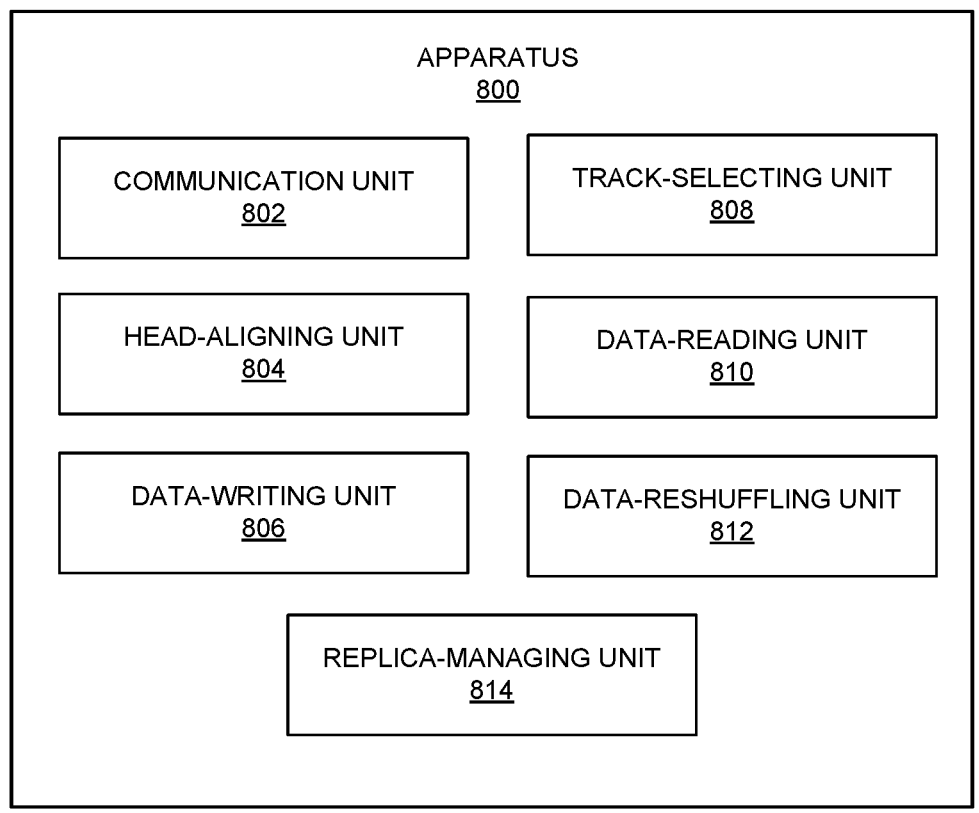
FIG. 8 illustrates an exemplary apparatus that facilitates operation of a storage system, in accordance with an embodiment of the present application.

FIG. 8 illustrates an exemplary apparatus that facilitates operation of a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices. Apparatus 800 can include at least one hard disk drive.

Apparatus 800 can also include a controller (not shown) with modules/units configured to perform various operations. Specifically, apparatus 800 (or its controller) can comprise modules or units 802-814 which are configured to perform functions or operations similar to modules 720-732 of computer system 700 of FIG. 7, including: a communication unit 802; a head-aligning unit 804; a data-writing unit 806; a track-selecting nit 808; a data-reading unit 810; a data-reshuffling unit 812; and a replica-managing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving a first request to write data to a hard disk drive (HDD) which comprises a plurality of platters with corresponding heads, wherein a respective platter includes a plurality of tracks;
aligning the heads at a same first position on a first track of each platter;
writing the data to the platters by distributing the data as a plurality of data sectors to track sectors located at the same first position on the first track of each platter;
receiving a second request to read the data from the HDD;
identifying the first track as a location at which the data is stored;
aligning the heads at a same random position on the first track of each platter;
reading, during a single rotation of the platters and beginning from the same random position, all data stored on the first track of each platter;
storing the read data in a data buffer; and
reshuffling the read data in the data buffer to obtain the data requested in the second request.

2. The method of claim 1, further comprising:
receiving a third request to read the data from the hard disk drive, wherein the data requested in the third request is stored in the first track of each platter;
determining that the data requested in the third request is stored in the data buffer;
retrieving the data requested in the third request from the data buffer without reading the data stored in the first track of each platter; and
returning the retrieved data.

3. The method of claim 1,
wherein aligning the heads at the same first position or the same random position comprises activating a plurality of arms associated with the plurality of platters of the hard disk drive, wherein a respective arm is attached to a corresponding head of a respective platter, and
wherein writing the data to the platters by distributing the data as a plurality of data sectors is based on a logical block address associated with a respective data sector.

4. The method of claim 1, wherein a respective track includes a plurality of pre-allocated spare sectors for remapping data stored in a faulty sector of the respective track.

5. The method of claim 1,
wherein the data buffer is maintained by the hard disk drive or a host; and
wherein reshuffling the read data in the data buffer is performed by the hard disk drive or the host.

6. The method of claim 1, further comprising:
writing replicas of the data to other hard disk drives of a distributed storage system,
wherein the replicas are written by distributing a respective replica as a plurality of data sectors to track sectors located at a same second position on a second track of each platter of a respective other hard disk drive;
receiving a third request to read the data stored in the distributed storage system;
obtaining a unique portion of the data requested in the third request from each of the hard disk drives on which the data or replicas of the data are stored;
concatenating the unique portions in a correct order to form the data requested in the third request; and
returning the concatenated data in response to the third request.

7. The method of claim 6,
wherein the unique portion of the data obtained from each of the hard disk drives is determined by a file system of the distributed storage system, and
wherein the concatenation of each unique portion comprises an entirety of the data requested in the third request.

8. A computer system, comprising:
a processor; and
a memory coupled to the processor and storing instructions which, when executed by the processor, cause the processor to perform a method, the method comprising:
receiving a first request to write data to a hard disk drive (HDD) which comprises a plurality of platters with corresponding heads, wherein a respective platter includes a plurality of tracks;
aligning the heads at a same first position on a first track of each platter;
writing the data to the platters by distributing the data as a plurality of data sectors to track sectors located at the same first position on the first track of each platter;
receiving a second request to read the data from the HDD;
identifying the first track as a location at which the data is stored;
aligning the heads at a same random position on the first track of each platter;
reading, during a single rotation of the platters and beginning from the same random position, all data stored on the first track of each platter;
storing the read data in a data buffer; and
reshuffling the read data in the data buffer to obtain the data requested in the second request.

9. The computer system of claim 8, wherein the method further comprises:
receiving a third request to read the data from the hard disk drive, wherein the data requested in the third request is stored in the first track of each platter;
determining that the data requested in the third request is stored in the data buffer;
retrieving the data requested in the third request from the data buffer without reading the data stored in the first track of each platter; and
returning the retrieved data.

10. The computer system of claim 8,
wherein aligning the heads at the same first position or the same random position comprises activating a plurality of arms associated with the plurality of platters of the hard disk drive, wherein a respective arm is attached to a corresponding head of a respective platter, and
wherein writing the data to the platters by distributing the data as a plurality of data sectors is based on a logical block address associated with a respective data sector.

11. The computer system of claim 8, wherein a respective track includes a plurality of pre-allocated spare sectors for remapping data stored in a faulty sector of the respective track.

12. The computer system of claim 8,
wherein the data buffer is maintained by the hard disk drive or a host; and
wherein reshuffling the read data in the data buffer is performed by the hard disk drive or the host.

13. The computer system of claim 8, wherein the method further comprises:
writing replicas of the data to other hard disk drives of a distributed storage system,
wherein the replicas are written by distributing a respective replica as a plurality of data sectors to track sectors located at a same second position on a second track of each platter of a respective other hard disk drive;
receiving a third request to read the data stored in the distributed storage system;
obtaining a unique portion of the data requested in the third request from each of the hard disk drives on which the data or replicas of the data are stored;
concatenating the unique portions in a correct order to form the data requested in the third request; and
returning the concatenated data in response to the third request.

14. The computer system of claim 13,
wherein the unique portion of the data obtained from each of the hard disk drives is determined by a file system of the distributed storage system, and
wherein the concatenation of each unique portion comprises an entirety of the data requested in the third request.

15. An apparatus, comprising:
a non-volatile memory of a hard disk drive,
wherein the hard disk drive comprises a plurality of platters with corresponding heads, wherein a respective platter includes a plurality of tracks; and
a controller configured to:
receive a first request to write data to the hard disk drive;
align the heads at a same first position on a first track of each platter; and
write the data to the platters by distributing the data as a plurality of data sectors to track sectors located at the same first position on the first track of each platter;
receive a second request to read the data from the HDD;
identify the first track as a location at which the data is stored;
align the heads at a same random position on the first track of each platter;
read, during a single rotation of the platters and beginning from the same random position, all data stored on the first track of each platter;
store the read data in a data buffer; and
reshuffle the read data in the data buffer to obtain the data requested in the second request.

16. The apparatus of claim 15, wherein the controller is further configured to:
receive a third request to read the data from the hard disk drive, wherein the data requested in the third request is stored in the first track of each platter;
determine that the data requested in the third request is stored in the data buffer;
retrieve the data requested in the third request from the data buffer without reading the data stored in the first track of each platter; and
return the retrieved data.

17. The apparatus of claim 15,
wherein a respective track includes a plurality of pre-allocated spare sectors for remapping data stored in a faulty sector of the respective track,
wherein aligning the heads at the same first position or the same random position comprises activating a plurality of arms associated with the plurality of platters of the hard disk drive, wherein a respective arm is attached to a corresponding head of a respective platter, and
wherein writing the data to the platters by distributing the data as a plurality of data sectors is based on a logical block address associated with a respective data sector.

* * * * *